Aug. 16, 1932.  J. F. ESCH  1,872,628
MATERIAL COATING APPARATUS
Filed Aug. 1, 1930     3 Sheets-Sheet 1
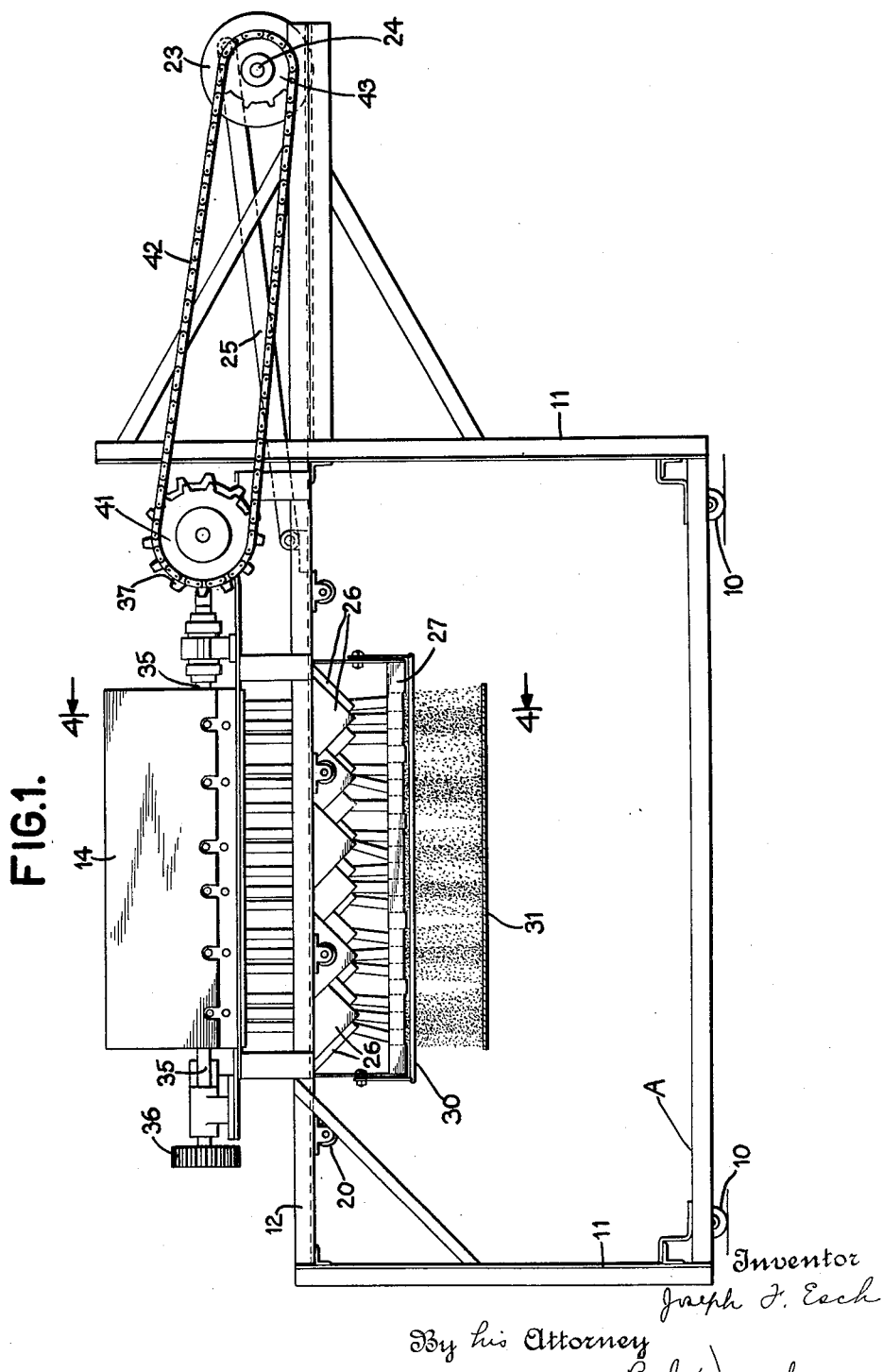

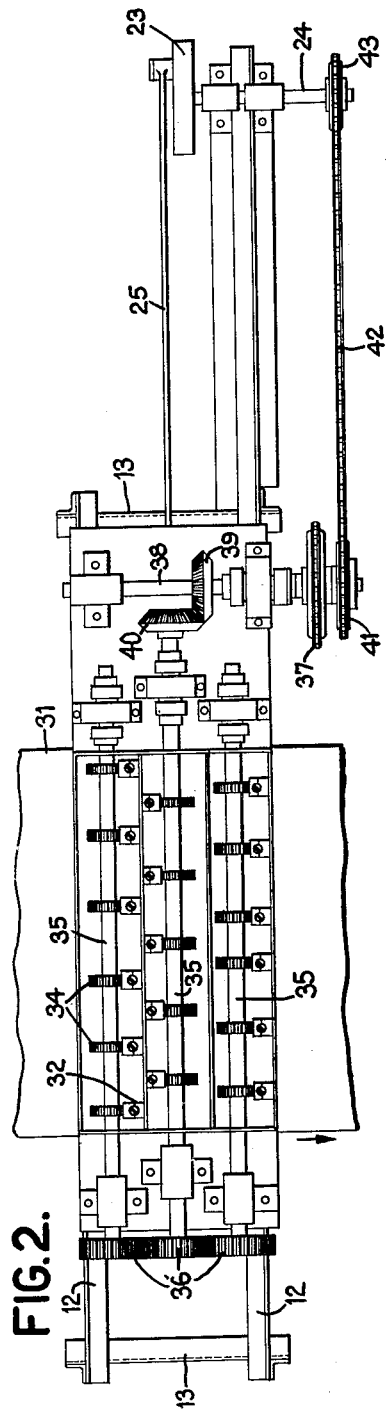
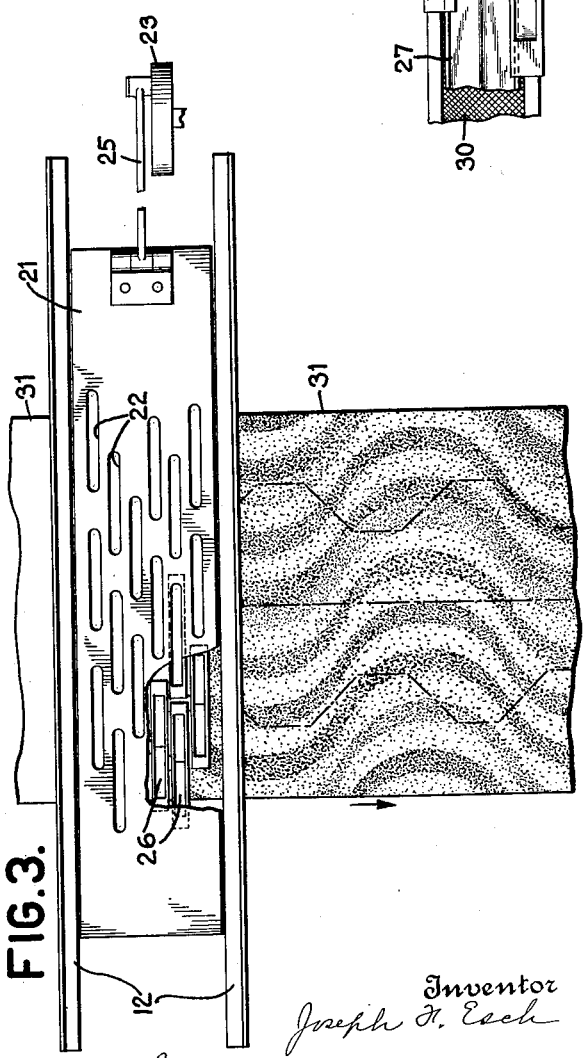
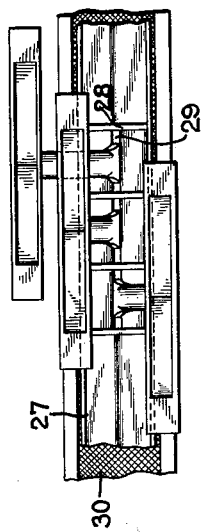

Aug. 16, 1932.    J. F. ESCH    1,872,628
MATERIAL COATING APPARATUS
Filed Aug. 1, 1930    3 Sheets-Sheet 3
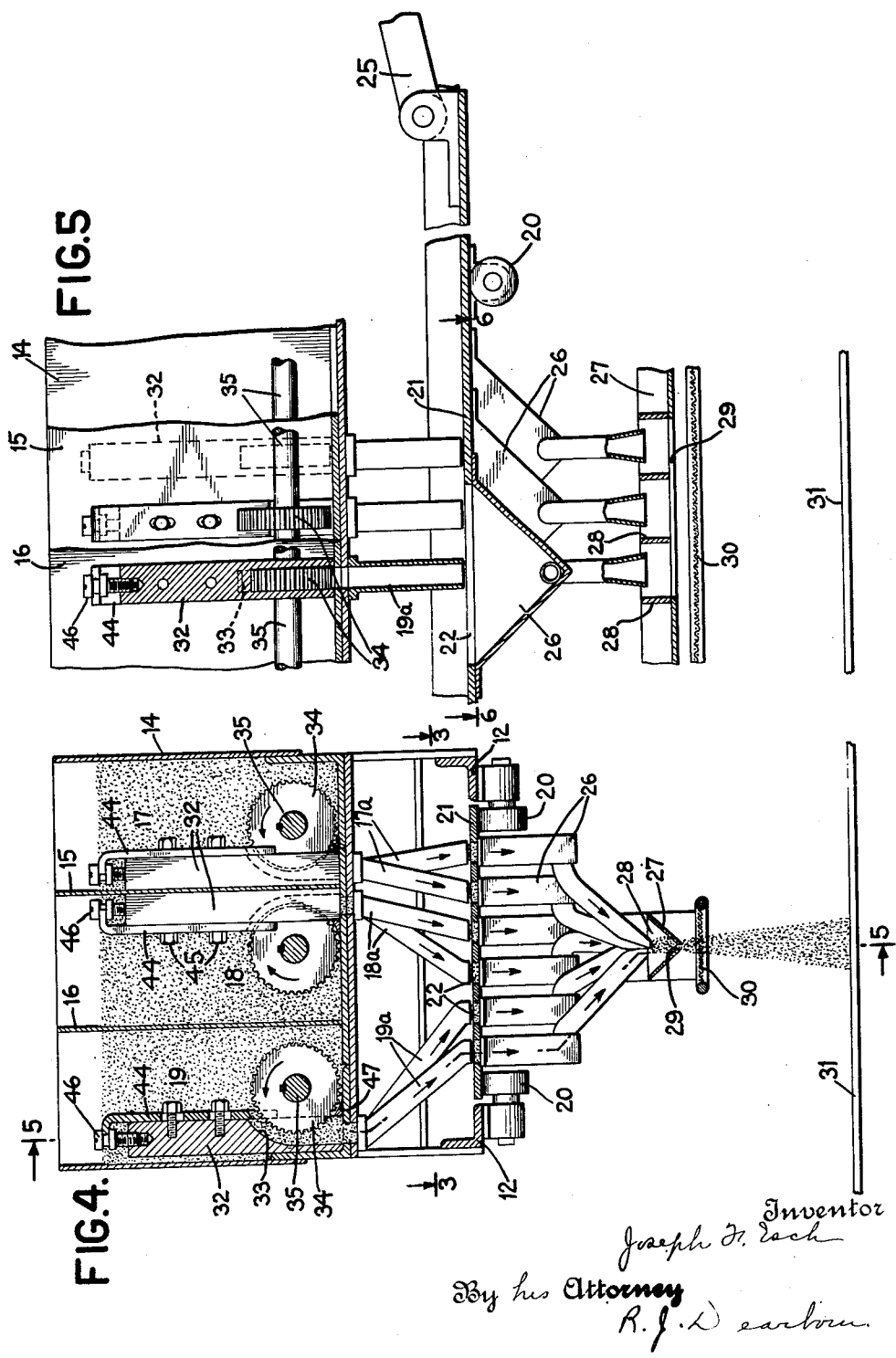

Patented Aug. 16, 1932

1,872,628

UNITED STATES PATENT OFFICE

JOSEPH F. ESCH, OF PORT NECHES, TEXAS, ASSIGNOR TO THE TEXAS COMPANY, OF NEW YORK, N. Y., A CORPORATION OF DELAWARE

MATERIAL COATING APPARATUS

Application filed August 1, 1930. Serial No. 472,325.

This invention relates to prepared roofing and has for an object to provide an improved material coating apparatus for use in connection with the manufacture of prepared roofing which is surfaced with grits or slates of different colors.

The base of my roofing material is preferably felt or other fabric which has been properly impregnated or coated with a weather-proofing material such as asphaltum or the like, and to which granular material such as grit, flaked slate, or other similar material may be added to produce a finished roofing having a particularly pleasing appearance to the eye.

In the drawings—

Figure 1 is a view in side elevation of a grit or slate applying machine embodying the present invention.

Figure 2 is a plan view of the same machine.

Figure 3 is a sectional plan view taken on line 3—3 of Figure 4, a portion of the apparatus having been broken away to disclose certain details of construction.

Figure 4 is a vertical sectional view on the line 4—4 of Figure 1.

Figure 5 is a view in sectional elevation taken on the line 5—5 of Figure 4, and Figure 6 is a sectional plan view taken on the line 6—6 of Figure 5.

By referring to the drawings it will be seen that there is provided a supporting structure in the form of a movable frame or carriage A which is made up of suitable angle irons bolted together and properly braced to give it sufficient strength. The supporting structure is mounted on roller wheels or casters 10 so that the apparatus may be readily moved about from place to place and consists of vertical corner posts 11 which are connected at a convenient working height by upper and lower side bars 12 and upper and lower end bars 13.

A hopper or receiving box 14 is supported above the top of the frame work just described and is divided longitudinally by partitions 15 and 16 into three compartments 17, 18, and 19, each of which is adapted to contain granular or flaky material such as grit or flaked slate of different colors. The granular or flaky material is supplied to the hopper from a larger storage hopper which is not illustrated. Each compartment is provided with a series of openings in the bottom which communicate severally with a corresponding series of inclined stationary spouts 17a, 18a and 19a which are secured in position beneath the respective openings.

A number of rollers 20 are mounted in bearing members suitably positioned on the opposite upper side bars 12 of the frame A and these rollers support a movable member in the form of a slotted sliding plate 21. Elongated slots 22 are arranged in parallel rows longitudinally of the plate and the slots of each row are staggered with respect to the slots of adjacent rows. The slots are arranged so that each of the down spouts 17a, 18a and 19a empties into a companion slot.

Plate 21 is adapted to move on the rollers 20 with a reciprocating motion which is produced by an eccentric 23 mounted on a shaft 24. An eccentric arm 25 connects sliding plate 21 and eccentric 23 so that any rotation of the eccentric causes the plate to move.

Funnel spouts 26, the upper open ends of which conform in shape and size to the slots 22, are secured on the underside of plate 21 in such a manner that each of the spouts is directly beneath and communicates with one of the slots 22. The lower ends of the funnel spouts are so arranged and positioned that they all empty into an open top receptacle or distributer 27 which is secured beneath the down spouts 26. The distributer is angular and substantially V-shaped in form with the apex pointing downwardly, and extends longitudinally for the full length of plate 21. The distributer is divided laterally by a series of plate partitions 28 into a series of spaces or compartments and each of the down spouts 26 empties into one of the spaces or compartments.

The distributer 27 is formed with a series of slots 29 in the apex of the angle through which the material in the various compartments flows onto a perforated member or screen 30 which is secured to move with the distributer to produce a slight intermixing or blending of adjacent streams of the material so as to form irregular or wavy fields or areas of different colors with narrow areas of blended colors between the different fields.

The screen also serves to remove any foreign matter that may have accumulated in the grit or slate. The sifted and slightly blended grit or slate passes through the screen 30 and onto the roofing sheet 31 which continually passes beneath the screen. The motion of the plate 21 and the consequent motion of the flowing material is across the width of the passing saturated felt making parallel lines giving a wavelike appearance of the different colored slates upon the felt substantially as shown in Figure 3.

Agitators are provided in each compartment of the hopper 14 to keep the granular or flaky material moving uniformly into and through the machine. Each agitator consists of a receiver 32 formed with a vertically disposed recess 33 which is positioned directly over one of the openings in the bottom of the hopper and an agitator is placed over each of the openings. A wheel 34 which is cross grooved on its periphery or circumference is positioned to fit directly into the opening 33 in receiver 32. The several wheels 34 in each compartment are keyed onto rotatable shafts 35 which extend longitudinally through each of the compartments 17, 18 and 19. The shafts extend through the ends of the hopper and at one end thereof the several shafts are provided with spur gears 36 which cooperate to produce simultaneous and uniform movement of the separate shafts when power is applied to one of them.

Power for operating the machine is imparted through a sprocket 37 mounted on a shaft 38 which is journaled in suitable bearing members at one end of the machine. Also mounted on shaft 38 is a bevel gear 39 which meshes with a similar bevel gear 40 mounted on one end of the shaft 35 which extends through the middle compartment of the hopper. Thus by applying power to sprocket 37 the several grooved wheels or gears 34 are operated to positively feed or move the grit or slate through the openings in the bottom of the hopper.

Another sprocket 41 is mounted on shaft 38 and a link chain 42 connects sprocket 41 with a sprocket 43 mounted on shaft 24 whereby the eccentric 23 and plate 21 are operated in synchronism with the rest of the machine.

In order that the flow of grit or slate through the recesses 33 and receivers 32 may be regulated, an adjustment plate 44 is adjustably mounted on the face of each receiver and by raising or lowering these plates the flow of material may be increased or decreased as desired. The plates are secured is position by means of cap screws 45 which extend through elongated vertical slots into the body of the receivers, and adjustment of the plates is obtained by means of adjustment screws 46 at the top of each receiver. Fillets 47 are provided beneath each of the wheels 34 for keeping the grit or slate from following the direction of the wheels.

From the foregoing it will be seen that the granular material in the hopper 14 is continuously supplied through the openings of the bottom of the several compartments to the spouts 17a, 18b and 19c which empty into companion slots in plate 21. Passing through the slots the material enters the funnel spouts 26 which are secured on the underside of the plate. Each of the funnel spouts empties into one of the compartments of the distributer and from the distributer the granular material descends through slots 29 in separated streams onto the screen 30 and upon passing through the screen there is a slight intermixing or blending of the material of adjacent streams so that the material as it is finally distributed upon the roofing, which is constantly passing beneath the machine, produces a continuous series of wavelike fields of different colors with interposed narrow areas of blended colors. When the material so coated is finally cut into roofing shingles and is laid on the roof the latter has what may be termed a somewhat mottled appearance.

It will be noticed that the shape of the funnel spouts 26 is such that regardless of the position of the plate 21 to which the spouts are secured the funnel spouts receive material from only one of the down spouts. As it is reciprocated, plate 21 is not moved farther from one extreme to another than the length of the elongated slots so that each down spout, though stationary, is always in communication with the same slot.

The particular manner of passing the roofing material constantly beneath the screen forms no part of the present invention and therefore has not been described in detail. Suffice to say that a sufficient length of the roofing material is continuously exposed in a horizontal plane directly beneath the screen 30 in the manner shown clearly in the drawings.

Apparatus of preferred form and construction has been illustrated and described for the purpose of showing a way in which this invention may be practiced, but the inventive thought upon which this application is based is broader than the illustrative embodiment thereof, and no limitations are intended other than those imposed by the appended claims.

I claim:

1. Material coating apparatus comprising a hopper adapted to contain granular material and having openings in the bottom thereof, downwardly extending spouts secured beneath each of said openings, a movable plate formed with a plurality of slots each of which is in communication with one of said spouts, spouts secured to the underside of said plate and registering with said slots, a slotted distributer secured beneath said spouts and divided laterally into compartments severally adapted to receive material from one of said spouts, and means for reciprocating the slotted plate and the structure supported thereby to cause the material passing through the distributer to fall in substantially parallel wavelike areas.

2. Material coating apparatus comprising a hopper divided into a plurality of separate compartments, each adapted to contain granular material of a different color and each having an opening in the bottom thereof, downwardly extending stationary spouts secured beneath each of said openings, a horizontally disposed movable plate disposed beneath said spouts and formed with a plurality of elongated slots, each of which is in communication at all times with one of said spouts, spouts secured to said plate beneath each of said openings, a distributor secured beneath said spouts and movable therewith, said distributor being divided laterally to form separate compartments, each adapted to receive material from one of the spouts immediately above, and means for reciprocating the slotted plate to effect a corresponding movement of the distributor to produce a wave-like application of the different colored materials received from the stationary spouts above.

In witness whereof I have hereunto set my hand this 23rd day of July, 1930.

JOSEPH F. ESCH.